April 4, 1961 S. Z. SIWEK 2,978,052
SELF-PROPELLED SYSTEM FOR POWER TOOLS
Filed Dec. 21, 1959 3 Sheets-Sheet 1

*INVENTOR.*
STANLEY Z. SIWEK
BY
ATTORNEYS

April 4, 1961 S. Z. SIWEK 2,978,052
SELF-PROPELLED SYSTEM FOR POWER TOOLS
Filed Dec. 21, 1959 3 Sheets-Sheet 2
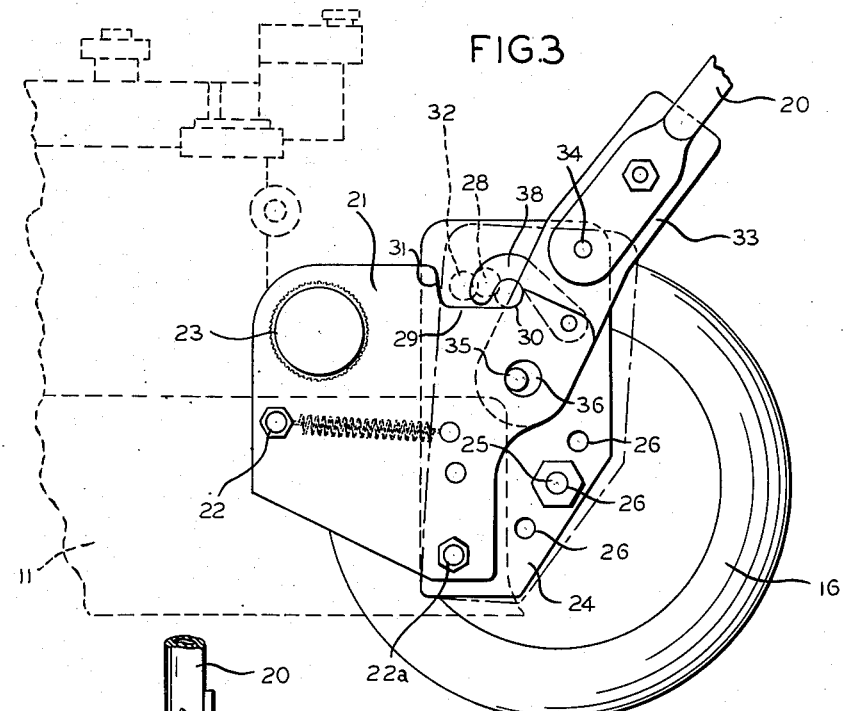
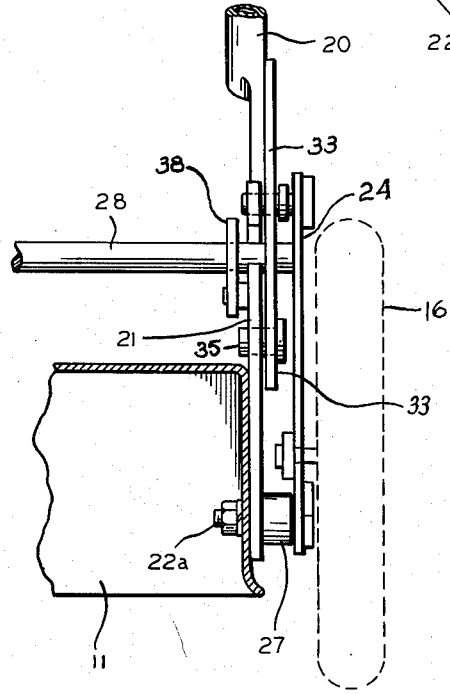
INVENTOR.
STANLEY Z. SIWEK
BY
ATTORNEYS April 4, 1961 S. Z. SIWEK 2,978,052
SELF-PROPELLED SYSTEM FOR POWER TOOLS
Filed Dec. 21, 1959 3 Sheets-Sheet 3

INVENTOR.
STANLEY Z. SIWEK
BY
ATTORNEYS

United States Patent Office 2,978,052
Patented Apr. 4, 1961

2,978,052
SELF-PROPELLED SYSTEM FOR POWER TOOLS

Stanley Z. Siwek, Chicago, Ill., assignor to Pioneer Gen-E-Motor Corporation, Chicago, Ill.

Filed Dec. 21, 1959, Ser. No. 861,120

10 Claims. (Cl. 180—19)

This invention is directed to improvements in self-propelled systems for wheel supported power tools. It is particularly concerned with improvements in systems for allowing simple and effective operator control of the drive system.

Some prior drive systems of this clas, as are exemplified in Rudman Patent No. 2,903,081, and Siwek Patent No. 2,896,731, utilize eccentrically mounted wheels for a rotary power tool such as a power mower, and a handle which is pivoted for "floating movement" with respect to the frame and which engages abutments carried by the wheel mounting members so that downward movement of the handle moves the supporting wheels for the mower out of engagement with the rotary friction driving elements. These systems are so designed that the weight of the handle is sufficient to stop the drive. While it is advantageous to so use this handle movement to control the drive system, these prior systems required counterweighted handles or relatively heavy handles so as to move the wheels out of engagement with the driving elements and thus stop the drive to the wheels whenever the operator released the handle for downward movement thereof.

Other drive systems use linkages connected to the eccentric wheel mounting members and connected to control linkages mounted on the operator handle, but these systems are relatively complex and expensive and do not use the natural fall of the handle to stop the drive.

One object of the present invention is to simplify and reduce the expense of self-propulsion systems of this general class.

Another object of the present invention is to provide a drive system of this general class with a positive acting linkage for positive control of the wheels while stabilizing the system and at the same time allowing a predetermined range of handle movement that is free from operative connection with the wheel mounting plates and the natural fall of the handle to stop the drive.

Another purpose of the invention is to provide means for allowing greater driving engagement between the wheels and friction driving elements under circumstances where greater power is needed, while at the same time limiting or establishing a maximum degree of engagement between the wheels and frictional driving elements.

Another purpose is to provide a linkage connection between a tool base and eccentrically mounted wheels on the base.

Other objects and purposes will appear from time to time in the course of the ensuing specification and claims when taken with the accompanying drawings in which:

Figure 3 is a side view of a portion of the mower tool illustrated in Figure 1 and particularly illustrating the details of the controlling system for moving the wheels into and out of engagement with the frictional driving elements;

Figure 4 is a rear view of that portion of the system illustrated in Figure 3;

Figure 1:
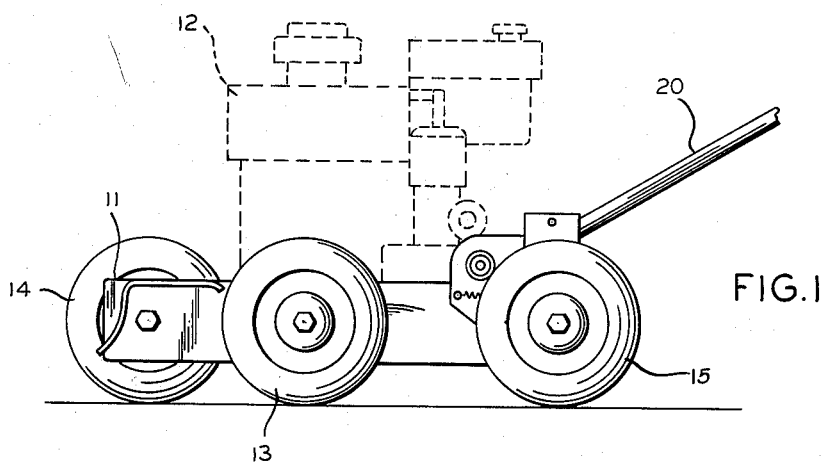
Figure 1 is a side view of a wheel supported power tool embodying the present invention.
Figure 2:
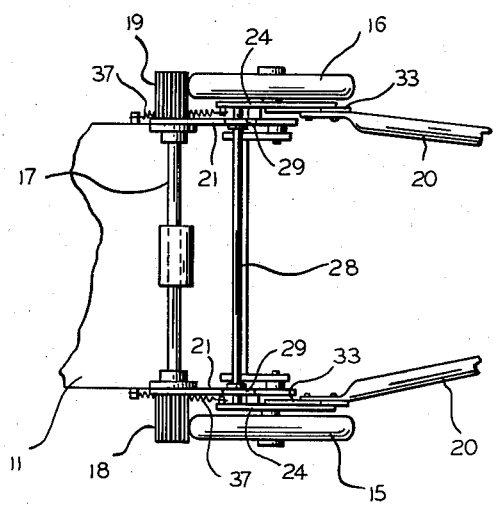
Figure 2 is a plan view of the tool illustrated in Figure 1.

With particular reference now to the drawings wherein like elements are designated by like characters throughout, and in the first instance to Figure 1, 11 designates a wheel supported base for a power tool as is exemplified by the power mower shown in the drawings. Power tools of this general class may have an internal combustion engine or other prime mover 12 mounted on the upper surface thereof for imparting power to a tool such as a rotary cutting blade disposed beneath the base 11 in the mower illustrated in the drawings. The tool is provided with the customary front supporting wheels 13 and 14 and rear wheels 15 and 16. In order to impart driving power to the rear wheels 15 and 16, the prime mover 12 may have a pulley and belt connection to a power shaft 17 which extends transversely to the longitudinal axis of the tool and is positioned above the base 11. Power shaft 17 carries frictional driving elements 18 and 19 at the ends thereof and positioned for engagement with the rear wheels at each side of the base 11. An operator guiding and controlling handle 20 is operatively interconnected with the rear wheels of the tool in a manner to be explained more fully hereinafter and extends upwardly and rearwardly from the base at an angle to the vertical.

Bearing plates 21 are fixed to the skirt of the tool base as by means of bolts 22 and 22a. These bearing plates 21 extend upwardly above the upper surface of the mower base 11. Since the bearing plates 21 are fixed to the base, they constitute, in effect, a portion of said base. The forward end of the bearing plates carries bearings 23 in which the power shaft 17 is journalled. A transmission such as is described in United States patent to Siwek, No. 2,896,731 may be used to interconnect the power shaft 17 with the motor 12 and rotate the frictional driving elements 18 and 19 constantly during operation of the motor 12.

The rear wheels 15 and 16 are journalled for rotation on wheel mounting plates 24. The wheels 15 and 16 may have axles 25 selectively mounted in a plurality of spaced apertures 26 so as to enable adjustment, from time to time, of the height of the read of the base 11. The wheel mounting plates 24 are spaced from the mower base and the bearing plates 21 as by means of the spacer 27, which is mounted on bolt 22a. The pivot bolts 22a for the wheel mounting plates are eccentric to the axis of rotation of the wheels in such a manner that the normal weight of the base 11 tends to bias the wheel mounting plates 24 about the axis of the pivot 22a and into engagement with the frictional driving elements 18 and 19, which are positioned forwardly of the rear wheels and above the upper surface of the base 11.

In order to stabilize the wheel mounting plates 24, a stabilizing bar or rod 28 is fixed to each of the wheel mounting plates and extends therebetween. The stabilizing bar 28 is adapted for movement within a cavity 29 formed in the upper surface of the bearing plates 21. The spaced end surfaces 30 and 31 of the cavities 29 limit the maximum degree of movement of the stabilizing bar 28 and thereby limit the movement of the wheel mounting plates 24 and wheels 15 and 16 associated therewith with relation to the base 11. The surfaces 30 and 31 are so spaced and positioned with relation to the position of the wheels 15 and 16 and driving elements 18 and 19 that when the bar 28 contacts the rear surfaces 30, the wheels 15 and 16 are positively out of engagement with the driving elements 18 and 19. The surfaces 31 are located such that when the bar 28 contacts these surfaces, the rubber tires of the rear wheels 15 and 16 are under compression in their bearing engagement with the driving elements 18 and 19 and the surfaces 31 thereby limit the maximum degree of compression of the tires of the rear wheels 15 and 16.

In the normal operating and driving position of the wheels, the stabilizing bar is located in the position of the dotted line 32, which line is spaced rearwardly of the surface 31. At this position of the stabilizing bar 28 the tires of the rear wheels 15 and 16 are only slightly under compression although the engagement between the tires and the frictional driving elements 18 and 19 is sufficient for normal propulsion of the mower or power tool.

In order to selectively control the movement of the wheel mounting plates 24 and thereby control propulsion of the mower, the side portions of handle 20 have extensions 33 coupled thereto and pivoted to the wheel mounting plates 24 as by means of the pivot pins 34. The lower end of the handle assembly is pivotally interconnected with the bearing plates 21 as by means of pivot pins 35 which are received within enlarged openings 36 in the bearing plates 21. Thus the handle assembly has a degree of swinging movement which may amount to on the order of 4 to 8 inches at the operator end of the handle, at which time the handle assembly merely pivots about the pivots 34 while the pivot pins 35 move within the openings 36 in the bearing plates 21. When the pivot pins 35 contact the upper end of the opening 36, as during downward movement of the handle 20, the forces acting downwardly on the handle are applied through the pivots 34 to the wheel mounting plates 24, with the result that the wheel mounting plates 24 and wheels associated therewith move rearwardly and thus break the driving engagement between the frictional driving elements 18 and 19 and the tires of the wheels.

When the handle is moved upwardly to a point where the pivot pins 35 contact the other end of the openings 36, and the movement continues, the upward forces applied to the handle result in forces being applied through the pivot pins 34 to move the wheel plates 24 and wheels forwardly to increase the tractive effort applied to the wheels. This is especially desirable when greater driving power is needed than in normal situations. In this case, the operator's desire for a helpful push to the mower causes a forced lifting of the handle and a forced movement of the wheels forwardly into engagement with the driving elements so as to tend to put the tires of the wheels under the degree of compression aforementioned, as limited by the contact between the stabilizing bar 28 and the forward surfaces 31.

Tension springs 37 may extend between the wheel mounting plates 24 and forwardly to a connection with the mower base 11 so as to provide additional bias tending to move the wheels forwardly into engagement with the frictional driving elements 18 and 19.

During normal operation of the mower, the operator simply lifts the handle 20 to a position where the pins 35 move freely within the opening 36. The normal weight of the mower base, as aided by springs 37, then causes the movement of the rear wheels 15 and 16 into a normal driving engagement with the frictional driving elements 18 and 19. During such normal operation, the handle may be moved upwardly and downwardly through a range of movement as limited by the length of the opening 36 without having any effect on the drive system. This is important inasmuch as during normal operation and when moving over slight bumps, over hills or through valleys in the lawn being traversed, the handle has a range of movement which accommodates differences in relative positions of the operator's feet and hands and mower without having any effect on the drive system. In other words, the handle may move upwardly and downwardly during such traversing of uneven ground.

When the operator desires to stop the mower, he may simply let the handle fall, in which case the weight of the handle is sufficient to bring about a forced disengagement of the wheels and frictional drive elements. The operator may of course move the handle positively downwardly if he so desires in order to break the driving connection.

Whenever the operator desires greater tractive effort, as when moving over rough terrain or up hills, he can simply move the handle upwardly with a natural push, in which case a higher degree of frictional engagement between the tires of the wheels 15 and 16 and the frictional driving elements 18 and 19 is attained.

In order to permanently lock the rear wheels 15 and 16 out of driving engagement, latches 38 may be pivoted to the bearing plates 21 and have hooked portions adapted to be swung over the stabilizing bar 28 when the stabilizing bar is in the rearward position, at which position the wheels are out of engagement with the driving elements. The latches 38 may be used whenever free wheeling is desired or during storage or starting of the mower.

Figure 5:
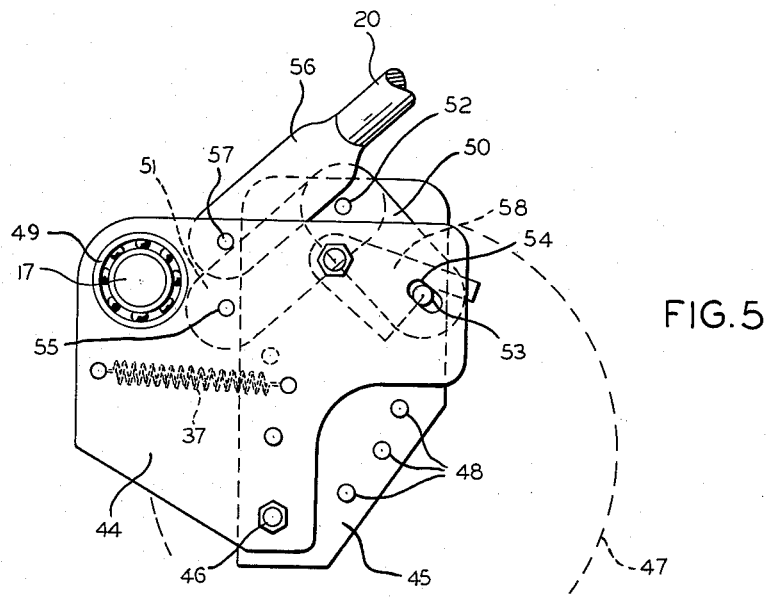
Figure 5 is a side view of a further embodiment of the invention.
Figure 6:
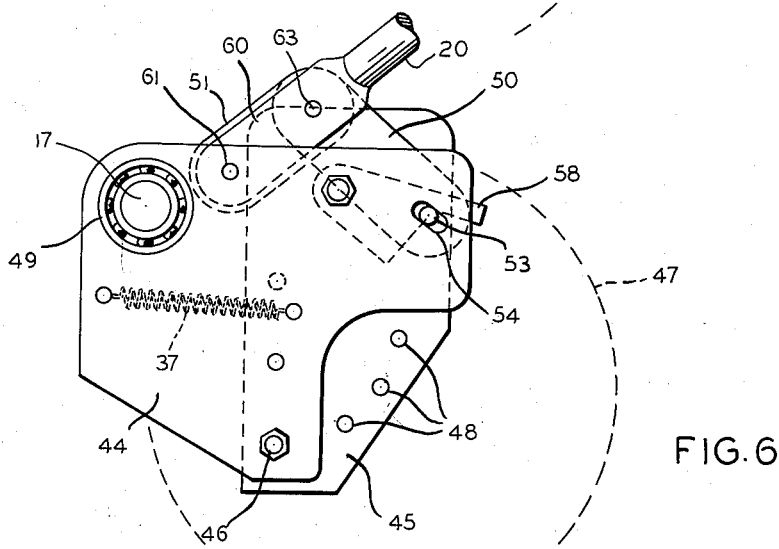
Figure 6 is a side view of a still further embodiment of the invention.

Figures 5 and 6 represent additional embodiments in which linkages are directly interconnected between the handle and the bearing plates and wheel mounting plates. In Figures 5 and 6 the bearing plates 44 support the power shaft 17 in the same manner that the bearing plates 21 in Figures 1 through 4 support the power shaft for the frictional driving elements. In Figures 5 and 6, however, the interconnection between the bearing plates 44, wheel mounting plates and handle 20 are different. It should be understood that the remainder of the mower base intended for use with the wheel mounting and control system illustrated in Figures 5 and 6 is the same as that illustrated in Figures 1 through 4.

In Figures 5 and 6, the wheel mounting plates 45 are spaced outward of the bearing plates 44 in similar manner to the embodiment of Figures 1 through 4, and pivoted to the bearing plates 44 and the mower base by pivot bolts 46. The axles for the wheels which are shown in dotted outline at 47 are supported in one of the apertures 48. The forward portion of the bearing plates 44 support bearings 49 for the power shaft and frictional drive elements in a fashion similar to that illustrated in Figures 1 through 4.

In Figure 5, the linkage between the bearing plate 44 and wheel mounting plate 45 consists of a pair of toggle links 50 and 51 which are pivotally connected by the pivot pin 52. A stabilizing tie rod 53 is fixed to the wheel mounting plates 45 and extends through slots 54 in the bearing plates 44. The link 50 is pivotally supported on the stabilizing bar 53 while the link 51 is pivoted to the bearing plate as by the pivot pin 55.

The links are so arranged that they are disposed in an inverted V-shaped fashion so that upon spreading of the links, the wheel mounting plates 45 move rearwardly and away from the engaged position between the wheels and the frictional drive elements, while when the links are moved more closely together, the wheel mounting plates 45 move forwardly and into engagement with the frictional drive elements.

The lower ends of the handle side portions 56 are pivoted to the bearing plates as by the pivot pins 57. The handle side portions are so positioned that they may rest upon the pivot pin 52 between the links 50 and 51.

Upon downward movement of the handle, which normally extends at an angle to the vertical, the handle weight is transmitted through the toggle links 51 and 50, as through the pivot 52, to cause spreading of the links and movement of the wheel mounting plates 45 to the disengaged position. Upon upward movement of the handle, the normal weight of the mower base is sufficient to move the wheel mounting plates 45 forwardly to the engaged driving position.

It should be noted that in Figure 5, the handle has a range of free movement upwardly and forwardly so that the operator may move the handle relative to the base without disengaging the drive system.

The range of movement of the wheel mounting plates 45 in Figure 5 is limited by the ends of the slots 54 which limit movement of the tie rod 53. The upper end of the slot 54 limits the maximum degree of compression between the tires of the wheels and the frictional drive elements while the lower end of the slot limits movement of the wheel mounting plates 45 to a position where the tires are spaced from the frictional drive elements.

Latches 58 may be pivoted to the bearing plates and have hooked portions adapted to swing over the tie rod 53 so as to hold the tie rod and thereby the wheel mounting plates in the disengaged position.

Figure 6 illustrates a further form of linkage interconnected between the bearing plates 44 and wheel mounting plates 45. In Figure 6, toggle links 50 are pivoted to the stabilizing bar 53 in a fashion similar to the links 50 in Figure 5. Toggle links 51 are pivoted to the bearing plates and to the links 50 in a manner similar to links 51 of Figure 5. Similarly, the latches 58 are pivoted to the bearing plates 44 and are adapted to be swung over the stabilizing bar 53 when the stabilizing bar 53 is at the lower end of the slot 54 or in the disengaged position. In Figure 6, the lower ends of the handle side portions 60 are parallel to links 51 and are pivoted to the bearing plates as by the pivots 61 for links 51, and pivotally connected to the links 50 by the pivot between links 50 and 51.

In Figure 6, downward movement of the handle causes a spreading of the bearing plates 44 and wheel mounting plates 45, whereas upward movement of the handle allows the links 50 and 51 to move more closely together under the influence of the weight of the mower base. When the handle moves downwardly, the weight of the handle is transmitted through the toggle links 50 and 51 to cause spreading of the wheel mounting plates 45 and bearing plates 44.

When the handle is moved upwardly, continued upward movement of the handle causes a more forced engagement of the frictional drive elements and the tires of the wheels. By associating the handle with the linkage connected both to the base and the wheel plates, the overall effect is to compound the action of the leverage system and to reduce the weight required for the handle.

It should be noted that in Figures 1-4, the handle side portions are detachably connected to the extension links 33. Thus the mower handle may be detached from the links 33 for ease in packing and shipping, while the wheel mounting plates and links are fully assembled. The handle side portions in Figures 5 and 6 are similarly detachably engaged, as by nut and bolt fasteners, to their associated linkages.

Whereas I have shown and described an operative form of the invention, it should be understood that this showing and description thereof are to be taken in an illustrative or diagrammatic sense only. There are many modifications to the invention which will fall within the scope and spirit thereof and which will be apparent to those skilled in the art. The scope of the invention should be limited only by the scope of the hereinafter appended claims.

I claim:

1. In a self-propelled tool of the type wherein eccentrically mounted wheels are moved into and out of driving engagement with frictional drive elements carried by a tool base for selective control of the propulsion of the base, the improvement comprising wheel mounting plates pivotally mounted on said base and having supporting wheels journalled thereon for rotation about axes eccentric to the pivot axes, said plates being movable toward and away from rotary frictional driving elements supported on said base for engaging and disengaging the drive between said wheels and elements, a linkage pivotally interconnecting portions of said base and each said wheel mounting plate to provide movement of said plates toward and away from said driving elements in consonance with the movement of said linkage, the linkage being connected to the base portion and wheel mounting plates at points spaced from one another, movement of said linkage in one direction causing movement of said plates away from said elements, and a movable operator controlling and guiding handle having an operative connection with said linkage and extending normally at an angle to the vertical, the normal weight of the handle, when imposed on said linkage being such as to provide a drive disengaging force, through said linkage in said one direction, to said wheel mounting plates.

2. The structure of claim 1 characterized by and including a stabilizing rod extending between said wheel mounting plates and fixed thereto and bearing plates on said base, said bearing plates having spaced surfaces engageable with said rod upon movement of said rod in opposite directions so as to limit movement of said rod and said wheel mounting plates.

3. The structure of claim 1 wherein said linkage consists of a link pivoted to each wheel mounting plate and said base portions, and said handle has side portions fixed to each link.

4. The structure of claim 1 wherein said linkage includes a pair of toggle links pivoted to each wheel mounting plate and said base portions, and said handle has side portions fixed to one of the links of each pair.

5. The structure of claim 1 wherein said linkage includes a pair of toggle links pivoted to each wheel mounting plate and said base portions, and said handle has side portions pivoted to said base and engageable with pivot pins connecting said toggle links.

6. The structure of claim 1 wherein the handle has an extension for each of the side portions thereof, which extensions provide the linkages which are pivotally connected between the base portions and said wheel mounting plates.

7. In a self-propelled system for power tools of the class including a wheel supported base and a motor thereon for operating a tool carried by said base, rotary frictional driving elements carried by said base and cooperatively connected with said motor for rotation thereof, said base having wheels eccentrically mounted for movement into and out of engagement with said driving elements to provide propulsion of said base when said wheels are in engagement with said driving elements, said wheels being carried on wheel mounting plates pivoted to said base, a handle having spaced side portions with extensions thereof pivoted to portions of said base, each extension being pivoted to one of the wheel mounting plates at points spaced from the point of connection to said base portion, said handle normally extending at an angle to the vertical and being adapted upon downward movement thereof to move said wheel mounting plates in a direction such that said wheels are moved out of engagement with said driving elements.

8. The structure of claim 7 wherein the pivotal connection between said handle and said base provides a predetermined range of pivotal movement of said handle about the pivotal axis of the pivot between said handle and wheel mounting plates without producing attendant movement of said wheel mounting plates.

9. The structure of claim 7 wherein said wheel mounting plates have a stabilizing bar extending therebetween and fixed thereto.

10. The structure of claim 7 wherein the pivotal connection between said handle and base includes a pivot pin movable within a slot, said pin and slot being associated with said handle and base to provide a predetermined range of movement of said handle relative to said base without affecting said wheel mounting plates.

References Cited in the file of this patent

UNITED STATES PATENTS

| | | |
|---|---|---|
| 2,138,239 | Irgens | Nov. 29, 1938 |
| 2,896,731 | Siwek | July 28, 1959 |
| 2,903,081 | Rudman | Sept. 8, 1959 |